United States Patent [19]
Siegel

[11] Patent Number: 4,874,208
[45] Date of Patent: Oct. 17, 1989

[54] ANTI-SKID CONTROL SYSTEM

[75] Inventor: Heinz Siegel, Stuttgart, Fed. Rep. of Germany

[73] Assignee: Robert Bosch GmbH, Stuttgart, Fed. Rep. of Germany

[21] Appl. No.: 322,462

[22] Filed: Mar. 13, 1989

[30] Foreign Application Priority Data

Jun. 10, 1988 [DE] Fed. Rep. of Germany ....... 3819812

[51] Int. Cl.⁴ .......................... B60T 8/32; B60T 8/34; B60T 13/12; B60T 17/02
[52] U.S. Cl. .................................. 303/116; 303/119; 303/110
[58] Field of Search ............... 303/116, 110, 119, 114, 303/92, 68-69, 10-12; 188/181 A

[56] References Cited

U.S. PATENT DOCUMENTS

| | | |
|---|---|---|
| 3,554,614 | 6/1969 | von Loewis . |
| 3,756,666 | 9/1973 | Leiber ............................. 303/116 X |
| 4,755,008 | 7/1988 | Imoto et al. .................... 303/116 X |
| 4,779,936 | 10/1988 | Farr ..................................... 303/116 |
| 4,783,126 | 11/1988 | Arikawc ........................... 303/116 X |
| 4,805,965 | 2/1989 | Jonner et al. ................... 303/110 X |

FOREIGN PATENT DOCUMENTS 1755965 1/1972 Fed. Rep. of Germany .

Primary Examiner—Douglas C. Butler
Attorney, Agent, or Firm—Edwin E. Greigg

[57] ABSTRACT

An anti-skid control system including a return feed device disposed between a self-priming pressure fluid pump and a multi-circuit master includes a first valve assembly associated with the wheel brake cylinder, a control valve assembly that communicates with the self-priming pressure fluid pump is connected to the feed device embodied as a piston pump, which in one displacement direction can be connected to at least one wheel brake cylinder by a first valve assembly, and in another displacement direction can be connected to at least one brake circuit chamber of a multi-circuit master cylinder.

20 Claims, 4 Drawing Sheets

ANTI-SKID CONTROL SYSTEM

BACKGROUND OF THE INVENTION

The invention is based on an anti-skid control system. An anti-skid control system of this kind is known (German Offenlegungsschrift No. 1 755 965). In this known anti-skid control system, a pressure fluid is pumped back into a brake line from a relief line, disposed between the valve assembly of at least one wheel brake cylinder and the feed device, by means of a return device actuatable by a hydraulically triggered switching valve. It can be assumed that the switching valve, triggered by a predetermined relief pressure, and that in the event of anti-skid control, which very rapidly supplies a large amount of pressure fluid to the relief line, the associated feed device will react too slowly and will not allow the fast reduction in pressure that is required.

OBJECT AND SUMMARY OF THE INVENTION

The anti-skid control system according to the invention has the advantage that the feed device required during the pressure reduction is embodied by the valve-controlled piston pump, and thus immediately receives the pressure fluid to be withdrawn from the wheel brake cylinders and pumps it back in the direction of the brake line.

It is particularly advantageous to provide a pump plunger in the feed device that in the case of traction control can pump pressure fluid into at least one wheel brake cylinder.

A further advantageous feature is the additional connection of the pressure fluid pump to a hydraulic brake booster.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
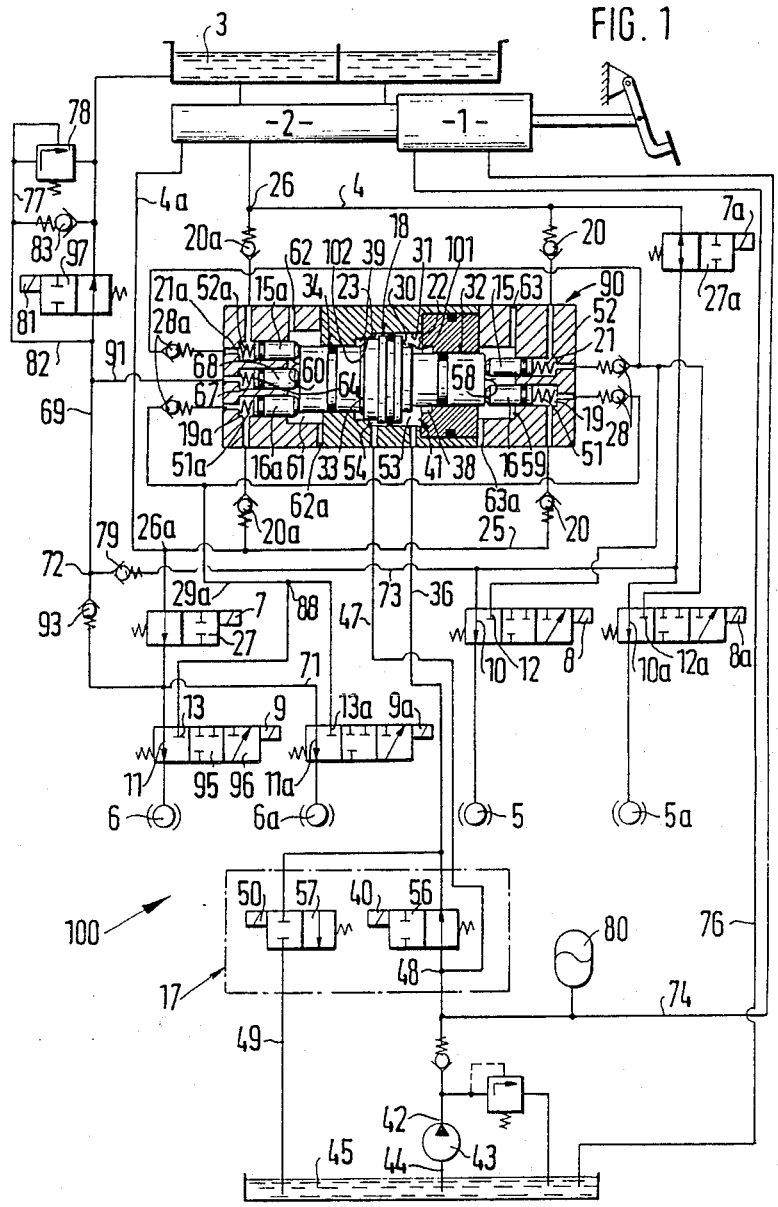
FIG. 1 shows a first exemplary embodiment of an anti-skid control system embodied according to the invention.

An anti-skid control system 100 for vehicles as shown in FIG. 1 has a multi-circuit master cylinder 2 of known design, connected to a brake booster 1. The multi-circuit master cylinder 2 communicates with a pressure fluid container 3. Brake lines 4; 4a, each from a different brake circuit chamber, begin at the multi-circuit master cylinder 2, each leading to a separate anti-skid-controlled wheel brake cylinder 5, 5a; 6, 6a of separate brake circuits. The brake lines 4, 4a each lead to an electromagnetically actuatable second valve assembly 7; 7a, and from there to an electromagnetically actuatable first valve assembly 8, 8a; 9, 9a of separate brake circuits, which assembly, in an open position 10, 10a; 11, 11a, is capable of establishing a connection with at least one of the wheel brake cylinders 5, 5a; 6, 6a associated with one drive axle. The first valve assemblies 8, 8a; 9, 9a may be embodied by either 3/3-way or 2/2-way valves.

In the open positions 10, 10a; 11; 11a of the first valve assemblies 8, 8a; 9, 9a, respective shutoff connections 12, 12a; 13, 13a are closed. By way of these shutoff connections, a connection with pump pistons 15, 15a; 16, 16a and cylinder chambers 19, 19a; 21, 21a, each piston and chamber being assigned to a respective brake circuit, can be established during the reduction in pressure from the wheel brake cylinders 5, 5a; 6, 6a. The pump pistons 15, 15a; 16, 16a of at least one brake circuit are connected to one actuating piston 18, connected to a control valve assembly 17 shown in dashed lines. The actuating piston 18 can be displaced in alternation by means of an imposition with pressure fluid by means of the control valve assembly 17, whereupon a first valve element 40 and a second valve element 50 can be opened and closed in contrary directions.

In one displacement direction, the cylinder chamber 19 associated with the pump piston 16 communicates via a one-way check valve 20, opening in the direction of the multi-circuit master cylinder 2, with a line segment 25, and the brake line 41 connected via a feed point 26a communicates with both, one brake circuit chamber of the multi-circuit master cylinder 2 and the second valve assembly 7, moved into a closing position 27, while the cylinder chamber 19a associated with the pump piston 16a communicates via a one-way check valve 28a opening in the direction of the cylinder chamber, and in the pressure reduction position of at least one first valve assembly 9, 9a, a line 29a leading to the first valve assemblies 9, 9a of one brake circuit is connected to at least one wheel brake cylinder 6, 6a. The stepped actuating piston 18 has been moved in this displacement direction by a first piston shoulder 30, upon which pressure fluid can act and which extends from an inner wall 31 of a stepped hydraulic chamber 41 as far as a first jacket face 32 of substantially smaller diameter of the actuating piston 18, against a second piston shoulder 33, facing the other direction, of the actuating piston 18, upon which shoulder 33 pressure fluid can act and which extends from the inner wall 31 of the hydraulic chamber 41 as far as a second jacket face 34 of the actuating piston 18 having a larger diameter than that of the jacket face 32.

A first hydraulic chamber section 53 facing the first piston shoulder 30 of the actuating piston 18 communicates via a line 36 through the first valve element 40 of the control valve assembly 17 with an outlet side 42 of a self-priming pressure fluid pump 43. The pressure fluid pump 43 communicates at an inlet side 44 with a supply container 45. A second hydraulic chamber section 54 oriented toward the second piston shoulder 33 of the actuating piston 18 is connected to the line 36 having a feed point 48, via a line 47 between the outlet side 42 of the pressure fluid pump 43 and the first valve element 40 of the control valve assembly 17.

A line segment 49 having the second valve element 50 and discharging downstream thereof into the supply container 45 branches off from the line 36, between the first hydraulic chamber section 53 and the first valve element 40 of the control valve assembly 17.

The actuating piston 18 is moved in a different displacement direction by the pressure fluid pressure engaging the second piston shoulder 33 of the actuating piston; this pressure fluid then is opposed by a substantially lesser pressure engaging the first piston shoulder 30 of the actuating piston 18.

The first hydraulic chamber section 54 communicates with the supply container 45 through the second valve element 50 as it assumes an opening position 57, while the first valve element 40 is switched into a closing position 56.

The pump pistons 15; 16 are pressed against the actuating piston 18, functioning as a piston pump at a first end face 58, remote from the first piston shoulder 30, by means of compression springs 51; 52 disposed in the cylinder chambers 19; 21. The pump pistons 15a; 16a are pressed against a second end face 60, remote from the second piston shoulder 33, of the actuating piston 18 by compression springs 51a; 52a disposed in the cylinder chambers 19a; 21a. In their dimensions, the end faces 58, 60 are preferably embodied with the diameter of the first jacket face 32 and second jacket face 34 of the actuating piston 18.

By the alternating motion of the actuating piston 18, a certain volume of air is positively displaced and aspirated into compensation chambers 59, 61 receiving this air volume, each by one end face 58, 60. The compensation chambers 59, 61 are embodied with inlet and outlet conduits 62, 62a, 63, 63a, which communicate with the atmosphere.

For the actuating piston 18, damper elements for the various end positions are disposed in the hydraulic chamber sections 53, 54.

In one exemplary embodiment, cylinder-jacket-like damper chambers 38, 39 are disposed opposite the piston shoulders 30, 33 of the actuating piston 18 in side walls 22, 23 integral with the housing; the damping chambers cooperate with piston steps 101, 102, provided on the piston shoulders 30, 33, in such a way that if the piston steps 101, 102 plunge into the damper chambers 38, 39, a hydraulic damping of the actuating piston 18 takes place on alternate sides.

The feed device, embodied as a piston pump, can be used not only for anti-skid control but also for traction control.

At least one further pump piston 68 is provided in a cylinder chamber 67, disposed in one direction of the actuating piston 18. Like the other pump pistons 15, 16, the pump piston 68 is pressed against the actuating piston 18, functioning as a piston pump, by a compression spring 64 disposed in the cylinder chamber 67. In one displacement direction, the cylinder chamber 67 communicates via a line 91 with a line 69, which is connected to the brake line 4a between the first valve assembly 9, 9a and the second valve assembly 7, and thus, when the first valve assembly 9, 9a is open, fluid flows directly to the wheel brake cylinders 6, 6a.

Remote from the first valve assembly 9, 9a, the line 69 is provided, following the branching off of the line 91, with a third valve assembly 81 and leads to the pressure fluid container 3. A one-way check valve 83 that closes in the direction toward the pressure fluid container 3 is disposed in a bypass line 82 that communicates with the line 69 and bypasses the third valve assembly 81.

If the second valve assembly 7 is switched into the closing position 27, and the third valve assembly 81 is switched into a closing position 97, then pressure fluid can be pumped out of the cylinder chamber 67 into the line 69, and a line segment 71 communicates with one of the first valve assemblies 9; 9a into one of the wheel brake cylinders 6; 6a, and simultaneously through both first valve assemblies 9, 9a into both wheel brake cylinders 6, 6a. A one-way check valve 93 that opens in the direction of the first valve assemblies 9, 9a is disposed in the line 69, between the branching off of the line segment 71 and the branching off of the line 91. The wheel brake cylinders 6, 6a are assigned to one brake circuit and one drive axle.

If the drive wheels are assigned to two brake circuits, then a line segment 73 having a one-way check valve 79 that opens in the direction of the other brake circuit branches off from a feed point 72 at the line 69 between the third valve assembly 81 and the check valve 93; the one-way check valve 79 communicates with the brake line 4 of the other brake circuit, in which the first valve assemblies 8, 8a of the other brake circuit are located and can be switched into different positions.

If a hydraulic brake booster 1 is used in the brake system, a line segment 74 communicating with the brake booster 1 is connected to the line 36 between the pressure fluid pump 43 and the first valve element 40. A pressure fluid reservoir 80 associated with the hydraulic brake booster 1 is connected with the line segment 74 and can be filled with pressure fluid by the pressure fluid pump 43 in the event that the reservoir pressure drops below a predetermined level. A return line 76 connected to the brake booster 1 communicates with the supply container 45.

Figure 2:
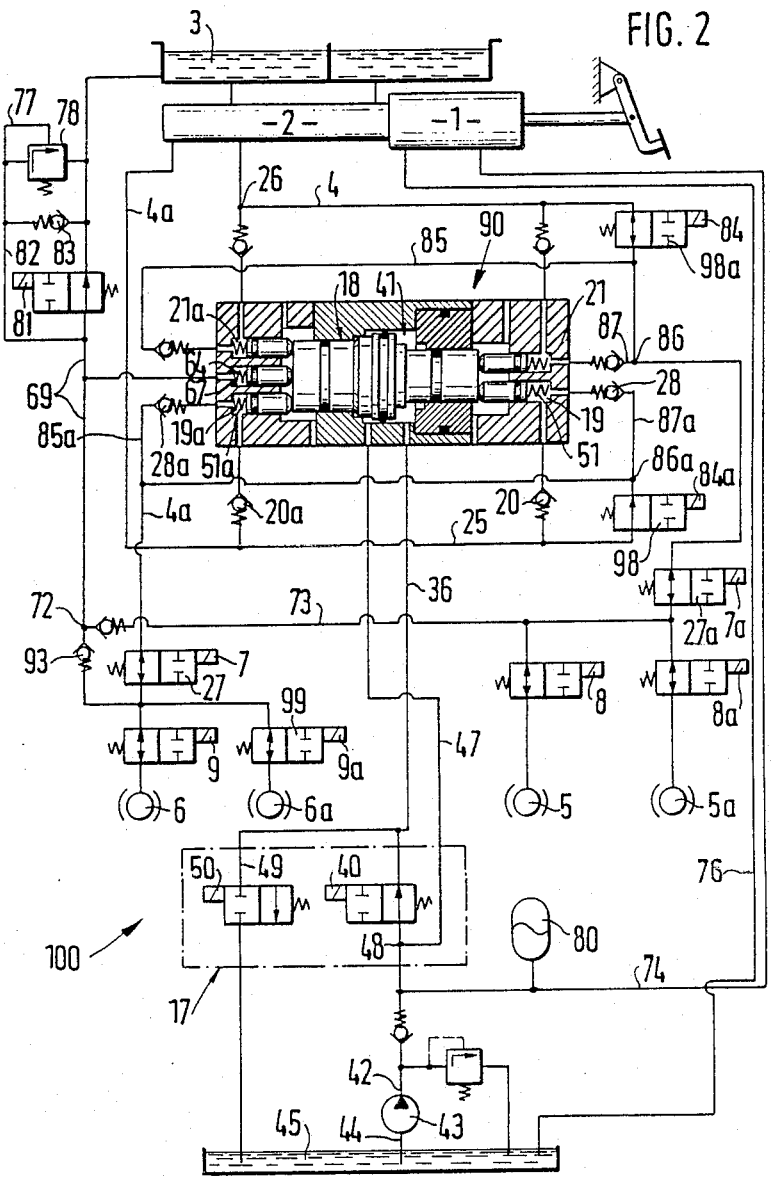
FIG. 2 shows a second exemplary embodiment of an anti-skid control system embodied according to the invention.

In the exemplary embodiment of FIG. 2, the same reference numerals as in the exemplary embodiment of FIG. 1 are used for identical and identically operating, components.

In FIG. 2, the first valve assemblies 8, 8a; 9, 9a are embodied as 2/2-way magnetic valves. The brake lines 4; 4a, each begin at a different brake circuit chamber of the multi-circuit master cylinder 2, each lead to one electromagnetically actuatable fourth valve assembly 84; 84a, and from there each extend through one of the second valve assemblies 7; 7a to the first valve assemblies 8, 8a; 9, 9a.

Discharging into the brake lines 4; 4a between the fourth valve assemblies 84; 84a and the second valve assemblies 7; 7a are not only a respective line segment 85; 85a, each of which communicates with one of the cylinder chambers 19a, 21a, but also, via a respective feed point 86; 86a, a respective connecting line 87; 87a connects to each of the cylinder chambers 19; 21.

Figure 3:
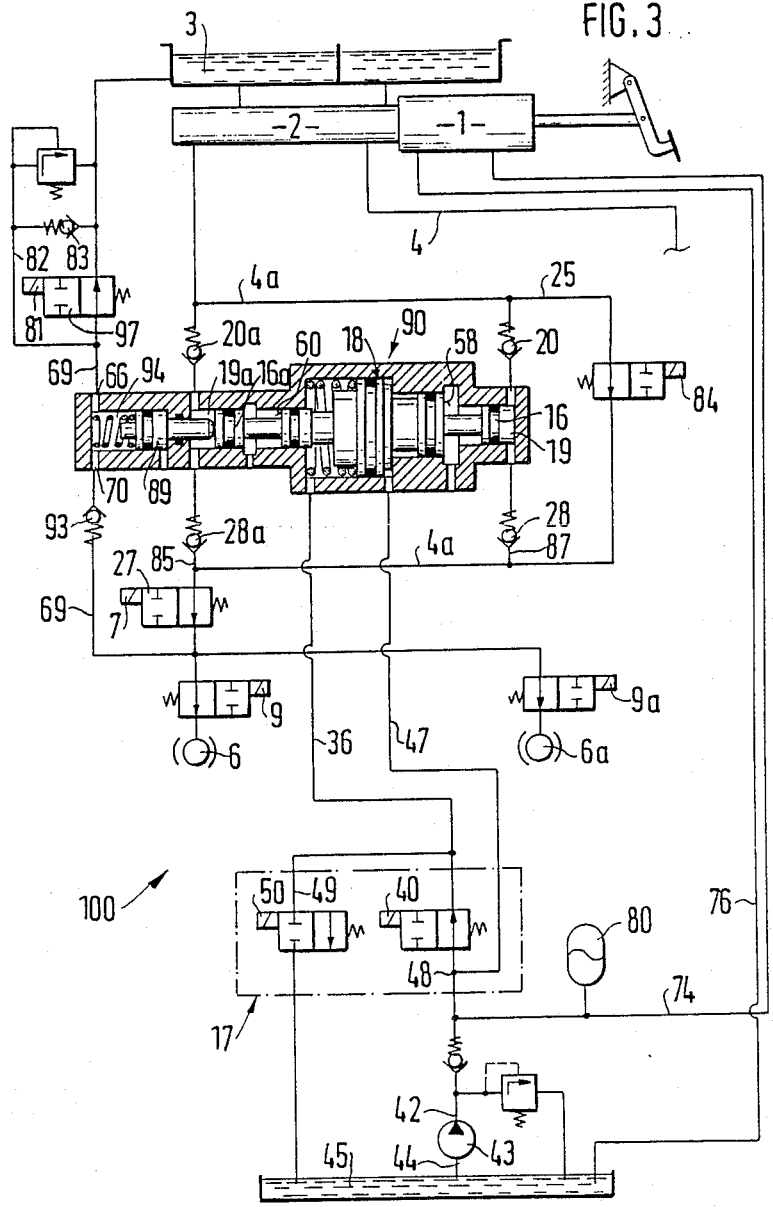
FIG. 3 shows a third exemplary embodiment of an anti-skid control system embodied according to the invention.

In the exemplary embodiment of FIG. 3, the same reference numerals as in the embodiments of FIGS. 1 and 2 are used for components that are the same and have the same function as those of those embodiments.

In FIG. 3, the feed device 90 is embodied with two pump pistons 16, 16a for the anti-skid control situation, one for each of the brake circuits, and these pistons are displaceable by end faces 58, 60, remote from one another, of the actuating piston 18. A third pump piston 89 is used for the traction control situation; it is applied in line with the pump piston 16a and is moved by pump piston 16a it when that piston moves.

Figure 4:
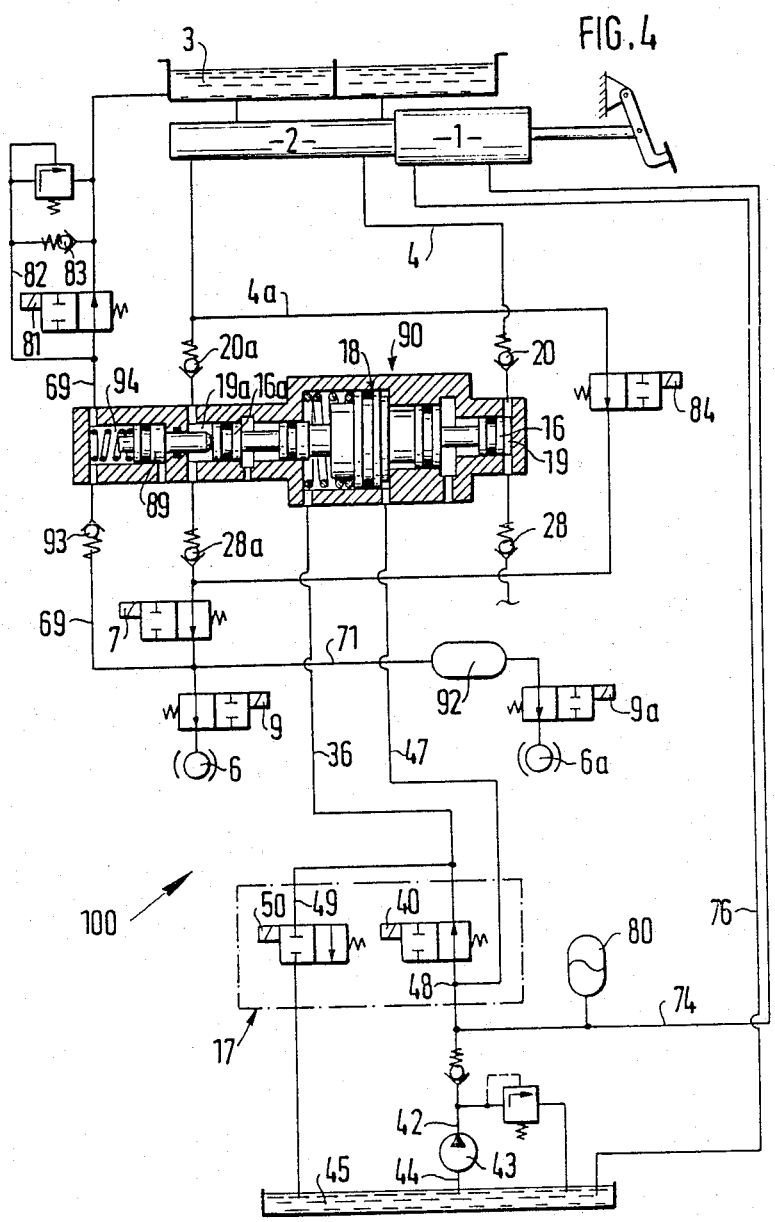
FIG. 4 shows a fourth exemplary embodiment of an anti-skid control system embodied according to the invention.

In the exemplary embodiment of FIG. 4, unlike the exemplary embodiment of FIG. 3, each pump piston 16; 16a and each associated cylinder chamber 19, 19a is connected to a respective brake line 4; 4a, each for a different brake circuit. A receiving chamber 92 is disposed in the line segment 71 between the second valve assembly 7 and the first valve assemblies 9; 9a. The first valve assemblies 9, 9a may be embodied as either 2/2-way magnetic valves or 3/3-way magnetic valves.

The mode of operation of the typical brake system is well known, and in a braking operation remains unaffected by either a particular valve assembly or by the disposition of the feed device 90 in the overall system. In the exemplary embodiment of FIG. 1, if one wheel, or more than one of the wheels together, is tending to skid, then sensors disposed on the wheels emit signals in a known manner to an electronic control unit, by which the corresponding first valve assemblies 8, 8a; 9, 9a are then electromagnetically triggered and switched out of the pressure buildup position into a second, pressure maintenance position or a third, pressure reduction position, which results in a certain pressure modulation in the wheel brake cylinders 5, 5a; 6, 6a. Upon the valve excitation, the pressure fluid pump 43 is switched on as well, to enable actuation of the feed device 90 by the control valve assembly 17. The pump pistons 15, 15a; 16, 16a disposed in the feed device 90 are now connectable with at least one wheel brake cylinder, in the respective associated brake circuit, by means of at least one of the first valve assemblies.

In the case of the wheel brake cylinder 6, during pressure maintenance the first valve assembly 9, comprising a 3/3-way magnetic valve, switches into a closing position 95, and the other first valve assembly 9a can remain in an open position 11a. If the pressure in the wheel brake cylinder 6 must subsequently be reduced, then the first valve assembly 9 is switched into a pressure reduction position 96, and the pump pistons 16, 16a, in one displacement direction, remove the now-excessive pressure fluid volume from the wheel brake cylinder 6 via the check valves 28, 28a and the line 29a, which leads via a feed point 88 to a respective first valve assembly 9, 9a, and pump it in another displacement direction via the check valves 20, 20a into the line segment 25 and from there into the line 4a communicating with the multi-circuit master cylinder 2. The second valve assembly 7 remains in an open position in this process.

If upon run up of one of the wheels, this wheel leaves its state serving to drive the vehicle, this is detected in a known manner by a sensor and passed on, by means of a signal of the electronic control unit, to at least one first valve assembly associated with one drive wheel. The wheel brake cylinders 6, 6a of one brake circuit can be associated with the drive wheels, and can be regulated both individually and in common.

If the drive wheels are disposed in two brake circuits, then by way of example the first valve assemblies 8 and 9 can likewise be regulated individually or in common with the associated wheel brake cylinders 5 and 6 via the line segment 73.

During a traction control operation in one brake circuit, the pressure fluid pump 43 is likewise switched on, and the pump piston 68, 69 is actuated as described by the actuating piston 18, so that pressure fluid flows into at least one wheel brake cylinder because of the fact that the second valve assembly 7 and the third valve assembly 81 are switched into closing positions 27, 97, and pressure fluid is aspirated from the pressure fluid container 3 via the check valve 83 and pumped by the pump piston 68, 69.

In the wheel brake cylinders 6, 6a associated with one brake circuit, if a pressure buildup is necessary only in one wheel brake cylinder 6, then the first valve assembly 9a associated with the wheel brake cylinder 6a is switched into a shutoff position with respect to the wheel brake cylinder 6a.

If a pressure buildup in two brake circuits is required in a traction control operation, the wheel brake cylinders 5, 6 belonging to the drive wheels are acted upon with pressure fluid, in that not only the second valve assembly 7 and the third valve assembly 81 but also the other second valve assembly 7a is switched into the closing position 27a, and the line segment 73 establishes the communication with the other brake circuit.

In a traction control operation, an undesirably high pressure value may arise in the line 69. A further bypass line 77, communicating with the bypass line 82 between the cylinder chamber 67 and the check valve 83, leads to an overpressure valve 78, which opens immediately in the direction of the pressure fluid container 3 upon a maximum allowable operating pressure of the check valve 83.

Once the traction control operation is completed, the second valve assemblies 7; 7a and the third valve assembly 81 are returned to their open positions.

For the anti-skid control operation and for the traction control operation, the control valve assembly 17 is triggered along with the pressure fluid pump 43 by an electronic control unit of a known type. Communication is established in alternation between the pump 43 and the opposed first and second cylinder chamber sections 53 and 54, respectively, at the actuating piston 18, as well as between the second cylinder chamber section 54 and the pressure fluid pump 43 and between the first cylinder chamber section 53 and the supply container 45.

The dimensions of the opposed operative faces of the first piston shoulder 30 and the second piston shoulder 33 of the actuating piston 18 are adapted in size to the output of the anti-skid control system.

The anti-skid control system can be operated with two different pressure fluids. One can be used between the pressure fluid pump 43 and the feed device 90, and another can be used between the feed device 90 and the brake system.

FIG. 2 shows an arrangement in which the first valve assemblies 8, 8a; 9, 9a comprise 2/2-way magnetic valves. If a certain pressure modulation is required at the first valve assembly 9 associated with one brake circuit, then the fourth valve assembly 84a associated with the same brake circuit is switched into a closing position 98, and the other first valve assembly 9a likewise assumes a closing position 99. The first valve assembly 9 thus communicates, via the second valve assembly 7 which is in the open position, with the cylinder chambers 19, 19a of the feed device 90, and pressure fluid can be taken from the first valve assembly 9 and pumped in the direction of the brake line 4a leading to the multi-circuit master cylinder 2.

FIG. 3 shows an arrangement in which the feed device 90 comprises two pump pistons 16, 16a for the anti-skid control situation, each for one brake circuit. To provide a second anti-skid- and traction-controlled brake circuit, one additional feed device 90 should be added to the brake system. The pump piston 89 pressed in line against the pump piston 16a is provided for the traction control situation. An associated cylinder chamber 94 is embodied with a pressure fluid inlet 66 and a pressure fluid outlet 70. The pressure fluid inlet 66 communicates via the line 69 and the bypass line 82 with the check valve 83, opening in the direction of the cylinder chamber 94, and can thus be connected to the attached line leading to the pressure fluid container 3.

The pressure fluid outlet 70 is connected via the line 69 and the check valve 93 to the brake line 4a between the second valve assembly 7 and the first valve assembly 9. By means of it, pressure fluid is pumped to one of the first valve assemblies 9; 9a, or to both first valve assemblies 9, 9a.

In the exemplary embodiment of FIG. 4, pressure fluid can be drawn from only one pump piston 16; 16a at a time from only one brake circuit 4; 4a, in the anti-skid control situation. If a pressure reduction is to be effected rapidly from the wheel brake cylinders 6, 6a, pressure fluid can first be received by the receiving chamber 92, before it is pumped by the feed device 90 in the direction of the multi-circuit master cylinder 2.

The foregoing relates to preferred exemplary embodiments of the invention, it being understood that other variants and embodiments thereof are possible within the spirit and scope of the invention, the latter being defined by the appended claims.

What is claimed and desired to be secured by Letter Patent of the United States is:

1. An anti-skid control system for vehicles, with the wheels of which each respective wheel brake cylinder communicates via a brake line with said multi-circuit master cylinder, at least one first valve assembly associated with one of the anti-skid- controlled wheel and located in a brake line, said at least one valve assembly assumes switching positions in an anti-skid control situation, for at least pressure buildup and pressure reduction; at least one fluid feed device associated with one of the brake circuits, said feed device receives pressure fluid flowing back from said at least one first valve assembly under pressure reduction conditions and pumps the pressure fluid in a direction of the brake line, a piston pump that serves said at least one feed device (90), said piston pump has an actuating piston (18), which is acted upon by pressure fluid that in an anti-skid control situation is carried in alternation from a control valve assembly (17) into a first or a second hydraulic chamber section (53, 54) disposed each on one side of said actuating piston (18) and in so doing displaces the actuating piston (18) such that at least two pump pistons (15, 15a; 16, 16a) contacting said actuating piston (18) are simultaneously actuated into cylinder chambers (19, 19a; 21, 21), which in one displacement direction, upon pressure reduction, aspirates pressure fluid from the wheel brakes into the respective cylinder chamber via check valves (28, 28a), and in another displacement direction pumps pressure fluid back into the brake line (4, 4a) from the respective cylinder chamber (19, 19a; 21, 21a) via other check valves (20, 20a).

2. An anti-skid control system as defined by claim 1, in which said control valve assembly (17) comprises a first valve element (40) and a second valve element (50), and said first valve element (40) is disposed in a line (36) from a pressure fluid pump (43) to a first hydraulic chamber section (53) associated with one side of said actuating piston (18), and the second valve element (50) is disposed in a line segment (49) that branches off from said line (36) between said the first valve element (40) and said first hydraulic chamber section (53) and leads to a supply container (45), and that a second hydraulic chamber section (54) associated with the other side of the actuating piston (18) has a smaller operative surface area and communicates with said line (36) between the pressure fluid pump (43) and the first valve element (40) via a line (47), wherein for actuating said actuating piston (18), said first (40) and said second (50) valve elements are opened and closed in opposite directions.

3. An anti-skid control system as defined by claim 2, in which a line segment (74) that is provided with a pressure fluid reservoir (80) and leads to a brake booster (1) is connected to said line (36) between the pressure fluid pump (43) and the first valve element (40) of said control valve assembly (17).

4. An anti-skid control system as defined by claim 1, in which a traction control situation, said actuating piston (18) is acted upon by pressure fluid via said control valve assembly (17), and for pressure buildup in the wheel brake cylinders (5, 5a; 6, 6a), a further pump piston (68) contacting said actuating piston (18) is actuatable, in which said further pump piston is displaceably supported in a cylinder chamber (67) and in the traction control situation communicates in one displacement direction with a supply source of pressure fluid and in another displacement direction communicates via the first valve assembly (8, 8a; 9, 9a) for pressure buildup with at least one wheel brake cylinder (5, 5a; 6, 6a).

5. Anti-skid control system as defined by claim 4, in which said control valve assembly (17) comprises a first valve element (40) and a second valve element (50), and that the first valve element (40) is disposed in a line (36) from a pressure fluid pump (43) to the first hydraulic chamber section (53) associated with one side of said actuating piston (18), and said second valve element (50) is disposed in a line segment (49) that branches off from said line (36) between said first valve element (40) and said first hydraulic chamber section (53) and leads to a supply container (45), and that said second hydraulic chamber section (54) associated with the other side of said actuating piston (18) has a smaller operative surface area and communicates with said line (36) between said pressure fluid pump (43) and said first valve element (40) via a line (47), wherein for actuating the actuating piston (18), said first (40) and said second (50) valve elements are opened and closed in opposite directions.

6. An anti-skid control system as defined by claim 4, in which for pressure buildup in the line (69, 73) leading from the cylinder chamber (67) to at least one wheel brake cylinder (5, 5a; 6, 6a) of one brake circuit, in the traction control situation, at least one second valve assembly (7; 7a), disposed in the connection between the multi-circuit master cylinder (2) and the first valve assemblies (8, 8a; 9, 9a), is switched into a closing position (27; 27a), and a third valve assembly (81), disposed in a connection between the cylinder chamber (67) and a pressure fluid container (3), is likewise switched into a closing position (97).

7. An anti-skid control system as defined by claim 6, in which in the traction control situation, a line (91) between the cylinder chamber (67) of the pump piston (68) and the third valve assembly (81) located in the closing position (97) communicates with a bypass line (82), which is further connected to the pressure fluid container (3) by means of a check valve (83) which opens in a direction of the cylinder chamber (67).

8. An anti-skid control system as defined by claim 1, in which a further bypass line (77) communicates with a bypass line (82) between a cylinder chamber (67) and a check valve (83) and leads to a pressure fluid container (3) and has an overpressure valve (78).

9. An anti-skid control system as defined by claim 8, in which said overpressure valve (78), in the traction control situation, opens in a direction of the pressure fluid container (3) at a value above a maximum allowable operating pressure.

10. An anti-skid control system as defined by claim 4, in which in a traction control situation, a connection (72, 73) that leads to the other brake circuit exists in a line between the cylinder chamber (67) of the pump piston (68) and at least one wheel brake cylinder (6, 6a) of one brake circuit, and is connected to at least one other wheel brake cylinder (5, 5a).

11. An anti-skid control system as defined by claim 1, in which at least one pump piston (89) for the traction control situation is disposed in a line with one of the pump pistons (16, 16a) for the anti-skid control situation.

12. An anti-skid control system as defined by claim 1, in which at least two pump pistons (15a, 16a, 68, 89) are actuatable simultaneously in the same operative direction.

13. An anti-skid control system as defined by claim 12, in which at least two pump pistons (15a, 16a, 68) are disposed parallel to one another.

14. An anti-skid control system as defined by claim 1, in which said first valve assemblies (8, 8a; 9, 9a) comprise 3/3-way magnetic valves.

15. An anti-skid control system as defined by claim 1, in which said first valve assemblies (8, 8a; 9, 9a) comprise 2/2-way magnetic valves.

16. An anti-skid control system as defined by claim 1, in which said actuating piston (18) has piston shoulders (30, 33), including operative surfaces which differ in size.

17. An anti-skid control system as defined by claim 1, in a pressure fluid used for the brake circuits is different from a pressure fluid used for actuating said actuating piston (18).

18. An anti-skid control system as defined by claim 1 which includes compression springs (51, 51a; 52, 52a; 64) disposed in cylinder chambers (19, 19a; 21, 21a; 67) in which said springs engage pump pistons (15, 15a; 16, 16a; 68) and press them against end faces (58, 60) of said actuating piston (18).

19. An anti-skid control system as defined by claim 1, in which one each of pump piston (16; 16a) is connected to one each brake line (4; 4a) per brake circuit.

20. An anti-skid control system as defined by claim 19, in which a second valve assembly (7; 7a) is provided in a connection between the multi-circuit master cylinder (2) and the first valve assemblies (9, 9a), and a receiving chamber (92) is disposed in a line (71) between the second valve assembly (7; 7a) and the first valve assemblies (9, 9a).

* * * * *